US010832085B2

(12) United States Patent
Gu et al.

(10) Patent No.: US 10,832,085 B2
(45) Date of Patent: Nov. 10, 2020

(54) IMAGE BINARIZATION USING MEAN RESTRAIN (71) Applicant: INTERNATIONAL BUSINESS MACHINES CORPORATION, Armonk, NY (US)

(72) Inventors: Bin Gu, Shanghai (CN); Xiao Chao Yan, Shanghai (CN); Chongming Wang, Shanghai (CN); Jian Bing Chen, Shanghai (CN); Min Xu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 16/123,668

(22) Filed: Sep. 6, 2018

(65) Prior Publication Data
US 2020/0082208 A1  Mar. 12, 2020

(51) Int. Cl.
G06K 9/62 (2006.01)
G06K 9/38 (2006.01)
G06K 9/34 (2006.01)
H04N 1/40 (2006.01)
G06K 9/46 (2006.01)

(52) U.S. Cl.
CPC ............ *G06K 9/6212* (2013.01); *G06K 9/34* (2013.01); *G06K 9/38* (2013.01); *G06K 9/4647* (2013.01); *H04N 1/40012* (2013.01); *G06K 2209/01* (2013.01)

(58) Field of Classification Search
CPC .................. G06K 9/6212; G06K 9/34
See application file for complete search history.

(56) References Cited

U.S. PATENT DOCUMENTS

| 8,162,125 | B1* | 4/2012 | Csulits | G07D 7/12 |
| | | | | 194/206 |
| 8,787,690 | B2 | 7/2014 | Kacher | |
| 9,172,842 | B2 | 10/2015 | Booth et al. | |
| 9,552,528 | B1 | 1/2017 | Elton et al. | |
| 2010/0158373 | A1* | 6/2010 | Li | G06K 9/38 |
| | | | | 382/172 |
| 2015/0086112 | A1 | 3/2015 | Tian | |

OTHER PUBLICATIONS

Sonar, "Image Segmentation and Binarization Technique for Manuscript", IJARCCE, vol. 5, Issue 1, Jan. 2016, 4 pages.

(Continued)

*Primary Examiner* — Tuan H Nguyen
(74) *Attorney, Agent, or Firm* — Scott Dobson; Andrew D. Wright; Roberts, Calderon, Safran & Cole, P.C.

(57) ABSTRACT

Methods and systems for image binarization using mean restrain are disclosed. A method includes: obtaining, by a computing device, a grayscale image; generating, by the computing device, a histogram from the grayscale image; determining, by the computing device, a foreground mean value and a background mean value for each pixel value in the histogram; determining, by the computing device, a binarization threshold using the foreground mean values and the background mean values; and generating, by the computing device, a binarized image using the grayscale image and the binarization threshold.

20 Claims, 8 Drawing Sheets (56) References Cited

OTHER PUBLICATIONS

Pugin et al., "Histogram method of image binarization based on fuzzy pixel representation", IEEE, 2017, http://ieeexplore.ieee.org/stamp/stamp.jsp?tp=&arnumber=8239497&isnumber=8239422, accessed Sep. 5, 2018, 1 page.

Shang et al., "An improved OTSU method based on Genetic Algorithm", Atlantis Press, vol. 71, 2016, 6 pages.

* cited by examiner

IMAGE BINARIZATION USING MEAN RESTRAIN

BACKGROUND

The present invention generally relates to computing devices and, more particularly, to methods and systems for image binarization using mean restrain.

Image binarization converts a color image or grayscale image into a black and white image. Image binarization is commonly performed in optical character recognition. In particular, image binarization is commonly performed as a preprocessing step, before characters in the image are identified.

Conventional image binarization methods and systems are inefficient (e.g., generate low quality black and white images) when used with input images having a low signal-to-noise ratio. For example, Otsu's method, which is a conventional image binarization method, is unable to efficiently process input images having a low signal-to-noise ratio and therefore generates low quality black and white images.

SUMMARY

In a first aspect of the invention, there is a method that includes: obtaining, by a computing device, a grayscale image; generating, by the computing device, a histogram from the grayscale image; determining, by the computing device, a foreground mean value and a background mean value for each pixel value in the histogram; determining, by the computing device, a binarization threshold using the foreground mean values and the background mean values; and generating, by the computing device, a binarized image using the grayscale image and the binarization threshold. This aspect of the invention addresses the above-mentioned shortcomings associated with conventional image binarization methods and systems by generating higher quality black and white images when used with input images having a low signal-to-noise ratio.

In another aspect of the invention, there is a computer program product that includes a computer readable storage medium having program instructions embodied therewith. The program instructions are executable by a computing device to cause the computing device to: receive a color image; convert the color image to a grayscale image; determine a foreground mean value and a background mean value for each grayscale value; determine a binarization threshold using the foreground mean values and the background mean values; and generate a binarized image using the grayscale image and the binarization threshold. This aspect of the invention addresses the above-mentioned shortcomings associated with conventional image binarization methods and systems by generating higher quality black and white images when used with input images having a low signal-to-noise ratio.

In another aspect of the invention, there is a system that includes: a hardware processor, a computer readable memory, and a computer readable storage medium associated with a computing device; program instructions configured to obtain a grayscale image; program instructions configured to generate a histogram from the grayscale image; program instructions configured to determine a foreground mean value and a background mean value for each pixel value in the histogram; program instructions configured to determine a binarization threshold using the foreground mean values and the background mean values; and program instructions configured to generate a binarized image using the grayscale image and the binarization threshold, where the program instructions are stored on the computer readable storage medium for execution by the hardware processor via the computer readable memory. This aspect of the invention addresses the above-mentioned shortcomings associated with conventional image binarization methods and systems by generating higher quality black and white images when used with input images having a low signal-to-noise ratio.

In an optional aspect of the invention, the foreground mean value is determined for each pixel value, pixel, in the histogram, his, using $\Sigma_{g=0}^{pixel} g \times his[g] \div \Sigma_{g=0}^{pixel} his[g]$.

In another optional aspect of the invention, the background mean value is determined for each pixel value in the histogram using $\Sigma_{g=pixel}^{255} g \times his[g] \div \Sigma_{g=pixel}^{255} his[g]$.

In another optional aspect of the invention, the determining the binarization threshold includes: determining, by the computing device, an overall mean value for each pixel value in the histogram using the foreground mean value and the background mean value for the pixel value; determining, by the computing device, a set of pixel values, each pixel value in the set having an overall mean value equal to the pixel value; and averaging, by the computing device, the set of pixel values to determine the binarization threshold.

In another optional aspect of the invention, the generating the binarized image includes, for each pixel in the grayscale image: determining, by the computing device, whether or not a grayscale value of the pixel is greater than or equal to the binarization threshold; in response to determining that the grayscale value of the pixel is greater than or equal to the binarization threshold, the computing device setting a corresponding pixel to black in the binarized image; and in response to determining that the grayscale value of the pixel is not greater than or equal to the binarization threshold, the computing device setting the corresponding pixel to white in the binarized image.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for image binarization using mean restrain. As described herein, aspects of the invention include a method and system that convert a color image to a grayscale image, determine an image binarization threshold using a mean restrain algorithm, and generate a black and white image using the grayscale image and the image binarization threshold.

Embodiments of the invention address the above-mentioned shortcomings associated with conventional image binarization methods and systems. Additionally, embodiments improve the functioning of a computer by providing a technical solution to the technical problem of image binarization. In particular, embodiments improve software by providing a technical solution for generating a binarized image that includes converting a color image to a grayscale image, determining an image binarization threshold using a mean restrain algorithm, and generating a black and white image using the grayscale image and the image binarization threshold. Additionally, implementations of the invention use techniques that are, by definition, rooted in computer technology (e.g., image binarization and optical character recognition, etc.) that cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
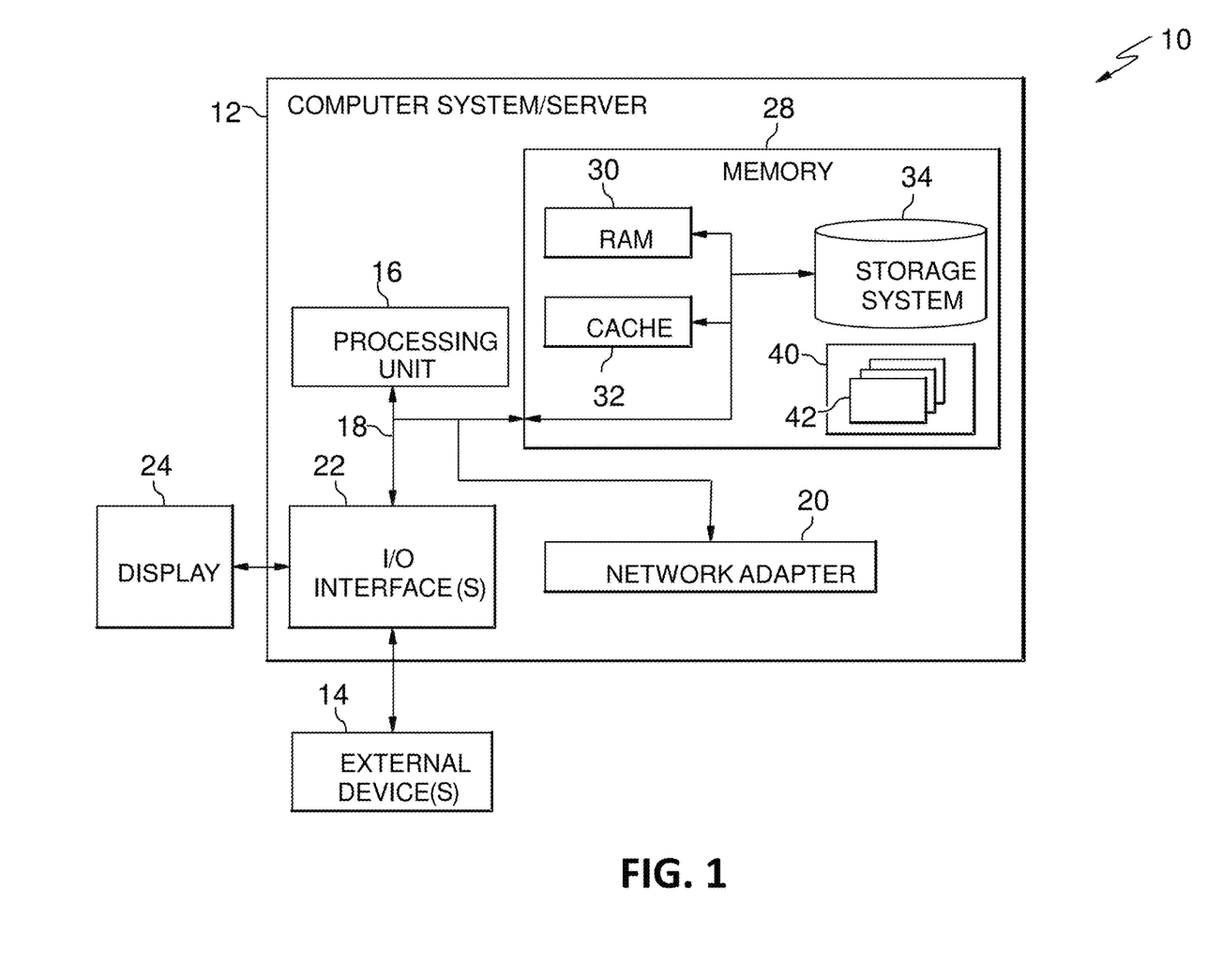
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
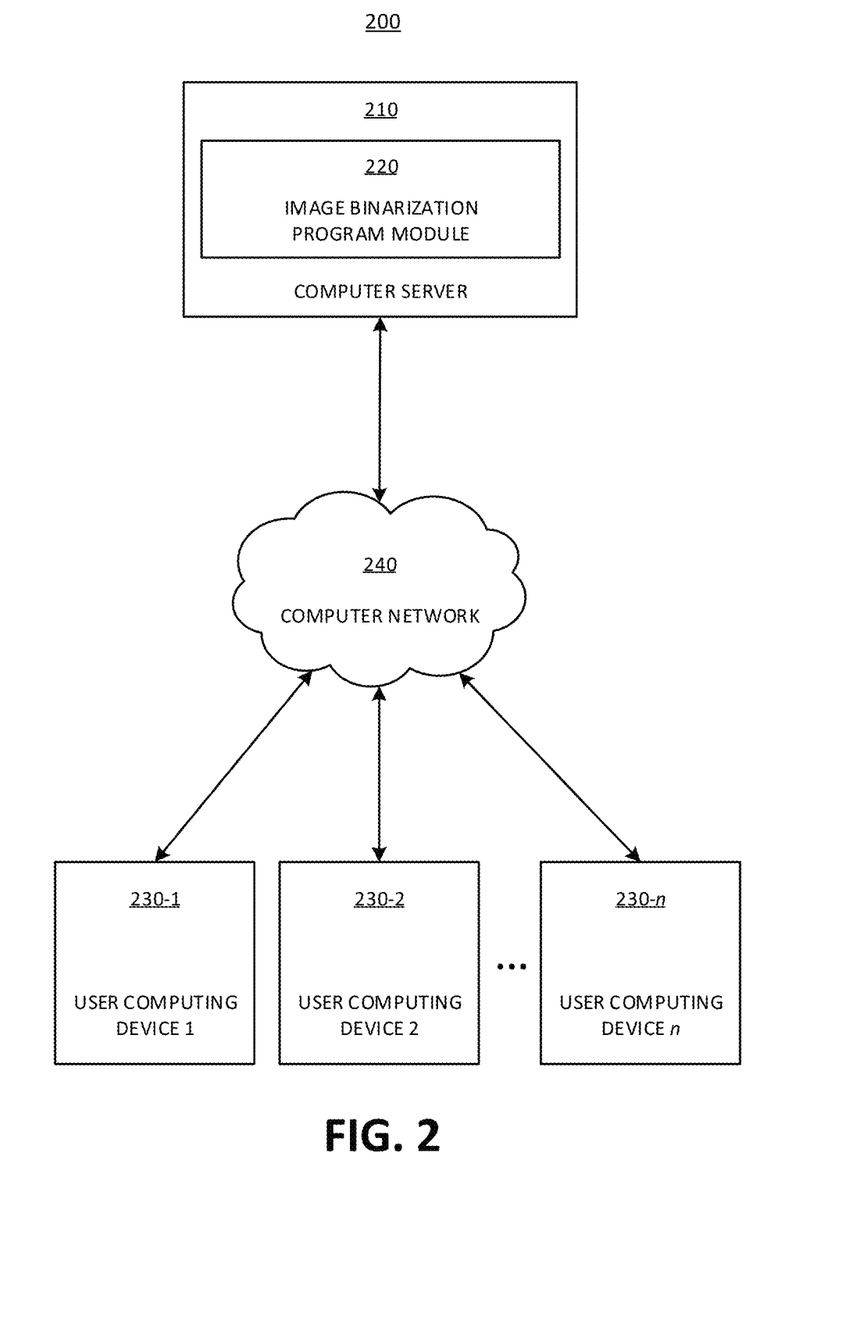
FIG. 2 depicts an illustrative environment in accordance with aspects of the invention.

FIG. 2 depicts an illustrative environment 200 in accordance with aspects of the invention. As shown, the environment 200 comprises a computer server 210 and a plurality of user computing devices 230-1, 230-2, . . . , 230-n which are in communication via a computer network 240. In embodiments, the computer network 240 is any suitable network including any combination of a LAN, WAN, or the Internet. In embodiments, the computer server 210 and the user computing devices 230-1, 230-2, ..., 230-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes an image binarization program module 220, which includes hardware and/or software and is one or more of the program modules 42 shown in FIG. 1. According to an embodiment, the image binarization program module 220 includes program instructions for generating a binarized image from a color image or a grayscale image. In embodiments, the program instructions included in the image binarization program module 220 of the computer server 210 are executed by one or more hardware processors.

Still referring to FIG. 2, in embodiments, each of the user computing devices 230-1, 230-2, ..., 230-n is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, each of the user computing devices 230-1, 230-2, ..., 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the user computing devices 230-1, 230-2, ..., 230-n is usable by a user to binarize a color image or a grayscale image by sending the color image or the grayscale image to the computer server 210 via the computer network 240. The computer server 210, using the image binarization program module 220, generates a binarized image from the color image or the grayscale image received from one of the user computing devices 230-1, 230-2, ..., 230-n, and sends the binarized image back to the one of the user computing devices 230-1, 230-2, ..., 230-n.

In embodiments, the user computing devices 230-1, 230-2, ..., 230-n performs optical character recognition or other processing on the binarized image received from the computer server 210. In other embodiments, the computer server 210 performs optical character recognition or other processing after generating the binarized image. The user computing devices 230-1, 230-2, ..., 230-n or the computer server 210 output text recognized in the binarized image by the optical character recognition process.

Figure 3:
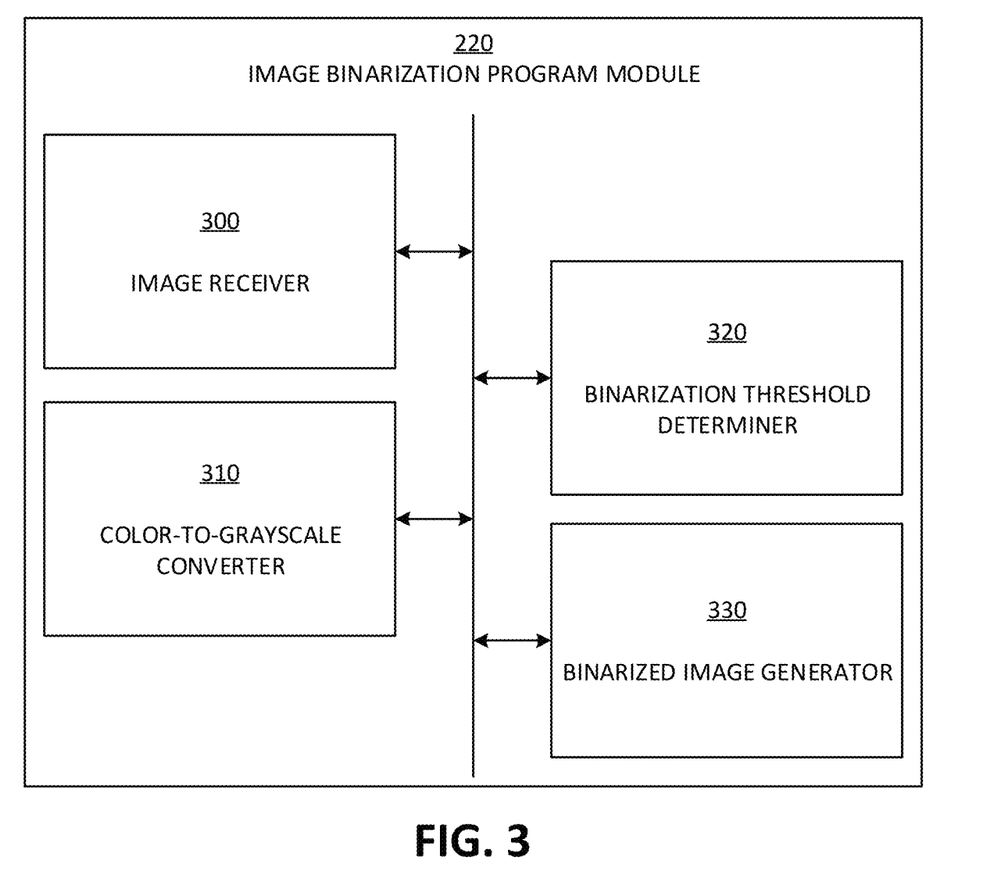
FIG. 3 depicts a block diagram of an exemplary program module in accordance with aspects of the invention.

FIG. 3 depicts a block diagram of an exemplary image binarization program module 220 in the computer server 210 (of FIG. 2) in accordance with aspects of the invention. In embodiments, the image binarization program module 220 includes an image receiver 300, a color-to-grayscale converter 310, a binarization threshold determiner 320, and a binarized image generator 330, each of which comprises one or more program modules 42 as described with respect to FIG. 1. In other embodiments, the image binarization program module 220 includes additional or fewer components than those shown in FIG. 3. In other embodiments, separate components are integrated into a single computing component or module. Additionally, or alternatively, in embodiments, a single component is implemented as multiple computing components or modules. According to another embodiment, the functions of one or more of the image receiver 300, the color-to-grayscale converter 310, the binarization threshold determiner 320, and the binarized image generator 330 are provided as services in a distributed computing environment.

In embodiments, the image receiver 300 receives a color image to be binarized from one of the user computing devices 230-1, 230-2, ..., 230-n. In embodiments, the color image is a document image or a photographic image which is to be processed using optical character recognition. In other embodiments, the color image is any other type of image which is to be binarized.

Still referring to FIG. 3, in embodiments, the color-to-grayscale converter 310 converts the color image received by the image receiver 300 into a grayscale image. In embodiments, the color-to-grayscale converter 310 uses any conventional grayscale conversion algorithm to perform the color-to-grayscale conversion. In an example, an averaging method is used in which a color pixel that is represented by an (R, G, B) triplet may be converted to grayscale by averaging the values such that the grayscale value for the pixel is set to (R+G+B)/3. In another example, a luminance method is used in which the color channels are weighted based on perception of the colors by human perception. In this method, in an example, a grayscale value for a pixel is determined as R*0.3+G*0.59+B*0.11.

In other embodiments, image receiver 300 receives a grayscale image from one of the user computing devices 230-1, 230-2, ..., 230-n. In this case, the color-to-grayscale converter 310 does not perform a color-to-grayscale conversion on the received grayscale image.

Still referring to FIG. 3, in embodiments, the binarization threshold determiner 320 determines a binarization threshold for the grayscale image generated by the color-to-grayscale converter 310 (or the grayscale image received by the image receiver 300). In particular, the binarization threshold determiner 320 builds a histogram using the grayscale image, determines a foreground (left) mean value and a background (right) mean value for each pixel value in the histogram, and then determines a threshold value for the image binarization.

In embodiments, the binarization threshold determiner 320 builds the histogram by determining a number or percentage of pixels in the grayscale image having each possible pixel value (grayscale value). For example, in the case of grayscale values ranging from 0 to 255, the binarization threshold determiner 320 determines the number or percentage of pixels in the grayscale image having a grayscale value of 0, the number or percentage of pixels in the grayscale image having a grayscale value of 1, ..., and the number or percentage of pixels in the grayscale image having a grayscale value of 255. The histogram generated by the binarization threshold determiner 320 is in the form of an array his[ ] having a number of elements equal to the number of possible grayscale values (e.g., 256). Each element in the array his[pixel] corresponds to a particular pixel value (grayscale value) and stores a number or a percentage of the pixels in the grayscale image having that particular pixel value.

In embodiments, after building the histogram, the binarization threshold determiner 320 determines a foreground (left) mean value and a background (right) mean value for each pixel value in the histogram. In particular, the binarization threshold determiner 320 determines the foreground (left) mean value for each pixel value in the histogram using Equation 1, below:

$$\text{left[pixel]} = \Sigma_{g=0}^{pixel} g \times \text{his}[g] \div \Sigma_{g=0}^{pixel} \text{his}[g] \quad (1)$$

The binarization threshold determiner 320 determines the background (right) mean value for each pixel value in the histogram using Equation 2, below:

$$\text{right[pixel]} = \Sigma_{g=pixel}^{255} g \times \text{his}[g] \div \Sigma_{g=pixel}^{255} \text{his}[g] \quad (2)$$

Note that, in Equation 2, 255 represents the maximum grayscale value. Accordingly, in other embodiments, if the maximum grayscale value is different from 255, a different number is used.

The binarization threshold determiner 320 then determines the overall mean value for each pixel value in the histogram using Equation 3, below:

$$\text{mean[pixel]} = (\text{left[pixel]} + \text{right[pixel]}) \div 2 \quad (3)$$

Next, in embodiments, the binarization threshold determiner 320 determines the threshold value for the image binarization by averaging the set of the pixels values having an overall mean value equal to the pixel value using Equation 4, below:

$$\text{for all elements} \leftarrow (\text{mean[pixel]} == \text{pixel}) \text{do return}$$
$$\text{threshold} = \text{avg(all elements)} \quad (4)$$

Still referring to FIG. 3, in embodiments, the binarized image generator 330 generates a binarized image using the grayscale image generated by the color-to-grayscale converter 310 (or the grayscale image received by the image receiver 300) and the threshold value for the image binarization determined by the binarization threshold generator 320. In particular, the binarized image generator 330 iterates through each pixel in the grayscale image and compares the grayscale value of the pixel to the threshold value for the image binarization. If the grayscale value of the pixel in the grayscale image is greater than or equal to the threshold value for the image binarization, the binarized image generator 330 sets the pixel value of the corresponding pixel in the binarized image to black. Otherwise, the binarized image generator 330 sets the pixel value of the corresponding pixel in the binarized image to white. In this manner, the binarized image generator 330 generates the binarized image by setting all of the pixels in the binarized image to black or white.

Figure 4:
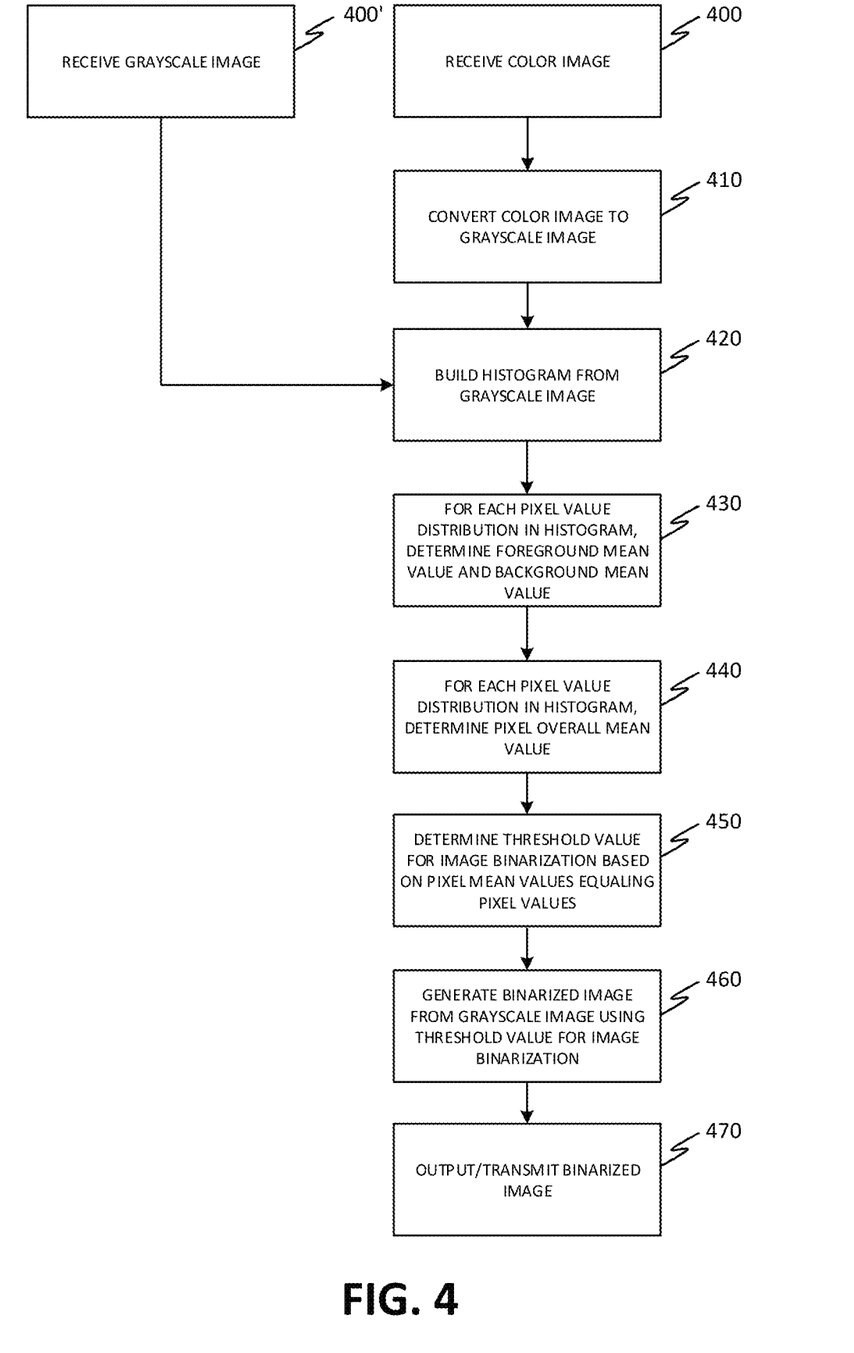
FIG. 4 depicts a flowchart of an exemplary method in accordance with aspects of the invention.

FIG. 4 depicts a flowchart of an exemplary method in accordance with aspects of the invention. The steps of the method are performed in the environment of FIG. 2 and are described with reference to the elements and steps described with respect to FIGS. 1, 2, and 3.

At step 400, the system receives a color image. In embodiments, as described with respect to FIG. 3, step 400 comprises the image receiver 300 receiving a color image to be binarized from one of the user computing devices 230-1, 230-2, . . . , 230-*n*. Flow then proceeds to step 410.

Alternatively, at step 400', the system receives a grayscale image. In embodiments, as described with respect to FIG. 3, step 400' comprises the image receiver 300 receiving a grayscale image to be binarized from one of the user computing devices 230-1, 230-2, . . . , 230-*n*. In this case, the flow then proceeds to step 420.

At step 410, the system converts the color image to a grayscale image. In embodiments, as described with respect to FIG. 3, step 410 comprises the color-to-grayscale converter 310 converting the color image received by the image receiver 300 into a grayscale image. In embodiments, the color-to-grayscale converter 310 uses any suitable grayscale conversion algorithm to perform the color-to-grayscale conversion.

At step 420, the system builds a histogram from the grayscale image. In embodiments, as described with respect to FIG. 3, step 420 comprises the binarization threshold determiner 320 building the histogram by determining a number of pixels in the grayscale image having each possible grayscale value.

At step 430, the system determines a foreground mean value and a background mean value for each pixel value in the histogram. In embodiments, as described with respect to FIG. 3, step 430 comprises the binarization threshold determiner 320 determining the foreground (left) mean value for each pixel value in the histogram using Equation 1 and determining the background (right) mean value for each pixel value in the histogram using Equation 2, as described above.

At step 440, the system determines an overall mean value for each pixel value in the histogram. In embodiments, as described with respect to FIG. 3, step 440 comprises the binarization threshold determiner 320 determining the overall mean value for each pixel value in the histogram using Equation 3, as described above.

At step 450, the system determines the threshold value for image binarization based on pixel mean values equaling pixel values. In embodiments, as described with respect to FIG. 3, step 450 comprises the binarization threshold determiner 320 determining the threshold value for the image binarization by averaging the set of the pixels values having an overall mean value equal to the pixel value using Equation 4, as described above.

At step 460, the system generates a binarized image from a grayscale image using the threshold value for image binarization. In embodiments, as described with respect to FIG. 3, step 460 comprises the binarized image generator 330 generating the binarized image using the grayscale image generated by the color-to-grayscale converter 310 and the threshold value for the image binarization determined by the binarization threshold generator 320.

At step 470, the system outputs/transmits the binarized image. In embodiments, as described with respect to FIG. 3, step 470 comprises the binarized image generator 330 outputting the binarized image to another program module configured to perform optical character recognition on the binary image, or transmitting the binarized image to one of the user computing devices 230-1, 230-2, . . . , 230-*n*.

Figure 5:
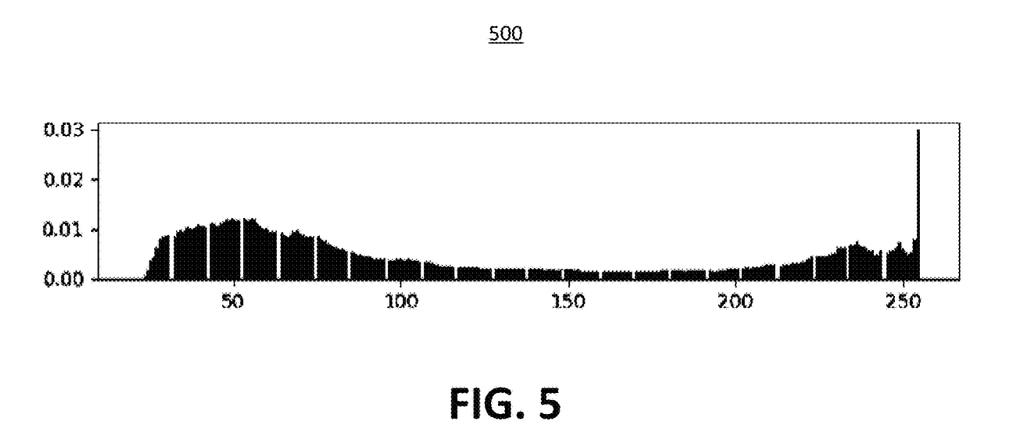
FIG. 5 depicts an exemplary histogram according to an embodiment.

FIG. 5 depicts an exemplary histogram 500 generated by the binarization threshold determiner 320 according to an embodiment. The histogram 500 depicts a percentage of pixels in a grayscale image having each possible grayscale value, ranging from 0 to 255.

Figure 6A:
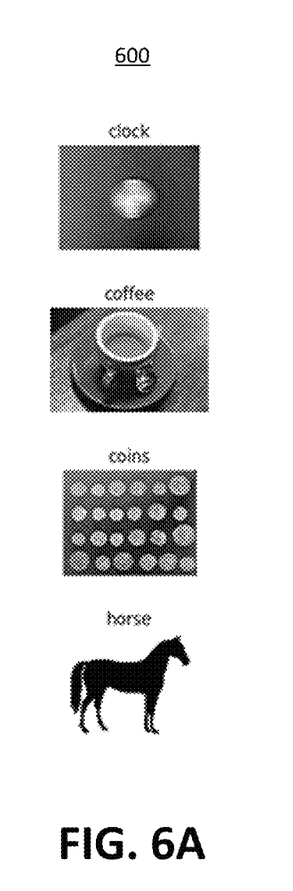
FIG. 6A depicts an exemplary set of grayscale images according to an embodiment.
Figure 6B:
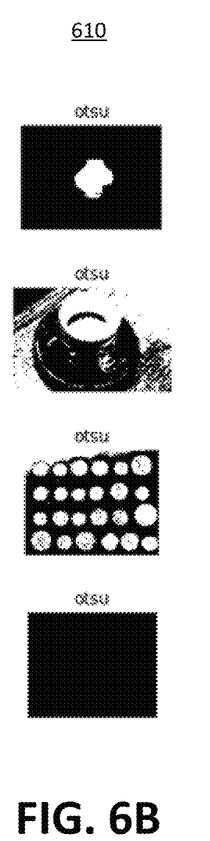
FIG. 6B depicts an exemplary set of binarized images generated from the set of grayscale images using Otsu's method.
Figure 6C:
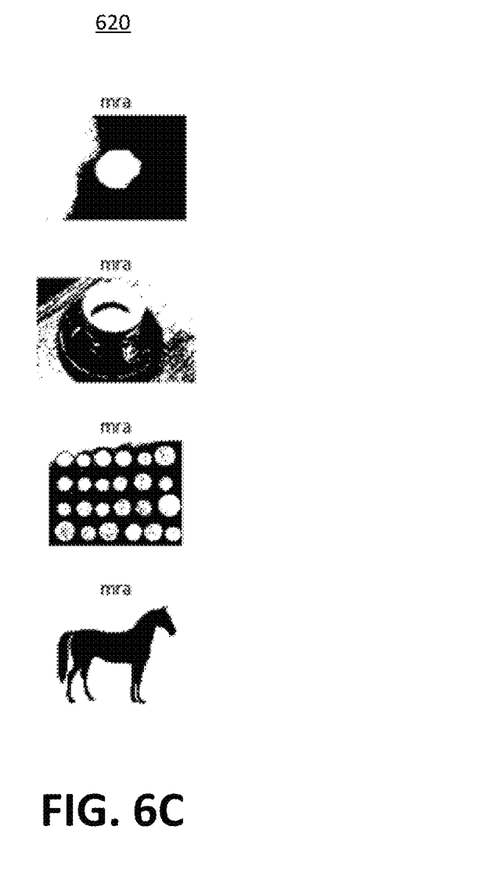
FIG. 6C depicts an exemplary set of binarized images generated from the set of grayscale images according to an embodiment.

FIG. 6A depicts an exemplary set of grayscale images 600 generated by the color-to-grayscale converter 310 according to an embodiment. FIG. 6B depicts an exemplary set of binarized images 610 generated from the set of grayscale images 600 of FIG. 6A using Otsu's method. FIG. 6C depicts an exemplary set of binarized images 620 generated from the set of grayscale images 600 of FIG. 6A using the binarization threshold determiner 320 and the binarized image generator 330 according to an embodiment. The set of binarized images 620 generated according to embodiments are improved over the set of binarized images 610 generated using Otsu's method. In particular, the set of binarized images 620 includes higher quality black and white images than those in the set of binarized images 610, particularly with respect to images corresponding to images in the set of grayscale images 600 having a low signal-to-noise ratio.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by a computing device, a grayscale image;
    generating, by the computing device, a histogram from the grayscale image;
    determining, by the computing device, a foreground mean value and a background mean value for each pixel value in the histogram;
    determining, by the computing device, a binarization threshold using the foreground mean values and the background mean values; and
    generating, by the computing device, a binarized image using the grayscale image and the binarization threshold.

2. The method according to claim 1, wherein the obtaining the grayscale image comprises:
    receiving, by the computing device, a color image; and
    converting, by the computing device, the color image to the grayscale image.

3. The method according to claim 1, wherein the foreground mean value is pixel determined for each pixel value, pixel, in the histogram, his, using $\Sigma_{g=0}^{pixel} g \times his[g] \div \Sigma_{g=0}^{pixel} his[g]$.

4. The method according to claim 3, wherein the background mean value is determined for each pixel value in the histogram using $\Sigma_{g=pixel}^{255} g \times his[g] \div \Sigma_{g=pixel}^{255} his[g]$.

5. The method according to claim 1, wherein the determining the binarization threshold comprises:
    determining, by the computing device, an overall mean value for each pixel value in the histogram using the foreground mean value and the background mean value for the pixel value;
    determining, by the computing device, a set of pixel values, each pixel value in the set having an overall mean value equal to the pixel value; and
    averaging, by the computing device, the set of pixel values to determine the binarization threshold.

6. The method according to claim 1, wherein the generating the binarized image comprises, for each pixel in the grayscale image:
    determining, by the computing device, whether or not a grayscale value of the pixel is greater than or equal to the binarization threshold;
    in response to determining that the grayscale value of the pixel is greater than or equal to the binarization threshold, the computing device setting a corresponding pixel to black in the binarized image; and
    in response to determining that the grayscale value of the pixel is not greater than or equal to the binarization threshold, the computing device setting the corresponding pixel to white in the binarized image.

7. The method according to claim 1, further comprising performing optical character recognition on the binarized image.

8. A computer program product comprising a non-transitory computer readable storage medium having program instructions embodied therewith, the program instructions executable by a computing device to cause the computing device to:
    receive a color image;
    convert the color image to a grayscale image;
    determine a foreground mean value and a background mean value for each grayscale value;
    determine a binarization threshold using the foreground mean values and the background mean values; and
    generate a binarized image using the grayscale image and the binarization threshold.

9. The computer program product according to claim 8, wherein the determining the foreground mean value and the background mean value for each grayscale value comprises:
    generating a histogram from the grayscale image; and
    using the histogram to determine the foreground mean value and the background mean values for each grayscale value.

10. The computer program product according to claim 9, wherein the foreground mean value is determined for each grayscale value, pixel, in the histogram, his, using $\Sigma_{g=0}^{pixel} g \times his[g] \div \Sigma_{g=0}^{pixel} his[g]$.

11. The computer program product according to claim 10, wherein the background mean value is determined for each grayscale value in the histogram using $\Sigma_{g=pixel}^{255} g \times his[g] \div \Sigma_{g=pixel}^{255} his[g]$.

12. The computer program product according to claim 8, wherein the determining the binarization threshold comprises:
   determining an overall mean value for each grayscale value in the histogram using the foreground mean value and the background mean value for the grayscale value;
   determining a set of grayscale values, each grayscale value in the set having an overall mean value equal to the grayscale value; and
   averaging, by the computing device, the set of gray scale values to determine the binarization threshold.

13. The computer program product according to claim 8, wherein the generating the binarized image comprises, for each pixel in the grayscale image:
   determining, by the computing device, whether or not the grayscale value of the pixel is greater than or equal to the binarization threshold;
   in response to determining that the grayscale value of the pixel is greater than or equal to the binarization threshold, setting a corresponding pixel to black in the binarized image; and
   in response to determining that the grayscale value of the pixel is not greater than or equal to the binarization threshold, setting the corresponding pixel to white in the binarized image.

14. The computer program product according to claim 8, the program instructions further executable by the computing device to cause the computing device to perform optical character recognition on the binarized image.

15. A system comprising:
   a hardware processor, a computer readable memory, and a non-transitory computer readable storage medium associated with a computing device;
   program instructions configured to obtain a grayscale image;
   program instructions configured to generate a histogram from the grayscale image;
   program instructions configured to determine a foreground mean value and a background mean value for each pixel value in the histogram;
   program instructions configured to determine a binarization threshold using the foreground mean values and the background mean values; and
   program instructions configured to generate a binarized image using the grayscale image and the binarization threshold,
   wherein the program instructions are stored on the non-transitory computer readable storage medium for execution by the hardware processor via the computer readable memory.

16. The system according to claim 15, wherein the program instructions are configured to obtain the grayscale image by:
   receiving a color image; and
   converting the color image to the grayscale image.

17. The system according to claim 15, wherein the program instructions are configured to determine the foreground mean value for each pixel value, pixel, in the histogram, his, by using $\Sigma_{g=0}^{pixel} g \times his[g] \div \Sigma_{g=0}^{pixel} his[g]$.

18. The system according to claim 17, wherein the program instructions are configured to determine the background mean value for each pixel value in the histogram by using $\Sigma_{g=pixel}^{255} g \times his[g] \div \Sigma_{g=pixel}^{255} his[g]$.

19. The system according to claim 15, wherein the program instructions are configured to determine the binarization threshold by:
   determining an overall mean value for each pixel value in the histogram using the foreground mean value and the background mean value for the pixel value;
   determining a set of pixel values, each pixel value in the set having an overall mean value equal to the pixel value; and
   averaging the set of pixel values to determine the binarization threshold.

20. The system according to claim 15, wherein the program instructions are configured to generate the binarized image by, for each pixel in the grayscale image:
   determining whether or not a grayscale value of the pixel is greater than or equal to the binarization threshold;
   in response to determining that the grayscale value of the pixel is greater than or equal to the binarization threshold, setting a corresponding pixel to black in the binarized image; and
   in response to determining that the grayscale value of the pixel is not greater than or equal to the binarization threshold, setting the corresponding pixel to white in the binarized image.

* * * * *